United States Patent Office 2,708,629
Patented May 17, 1955

2,708,629

PROCESS OF CURING MINNOWS

Wayne M. Judy, International Falls, Minn.

No Drawing. Application May 24, 1954,
Serial No. 432,045

2 Claims. (Cl. 99—3)

This invention relates generally to the class of fishing and is directed particularly to improvements in the preparation of fishing bait.

A principal object of the present invention is to provide a novel process of preserving bait fish or minnows for a relatively long period of time and without the use of refrigeration.

Another object of the invention is to provide a novel process of treating or curing bait fish or minnows or any other fish legal and suitable whereby such bait may not only be kept for a relatively long time without refrigeration but cumbersome methods necessary to the transportation and use of live bait are eliminated.

A still further object of the invention is to provide an improved process of curing and preserving bait fish or minnows whereby the finished product will be attractive in color, natural in action when in use and have a taste attractive to various species of fish sought after by anglers.

Still another object of the invention is to provide an improved process of preserving bait fish whereby a suitable substitute for live minnows is made available in places where it is impossible or impractical to secure live bait.

In the following description of the invention reference will be made to bait fish or minnows but it is to be understood that the term "minnow" is used generally to describe any species of minnow or fish which may be legally used and which may be suitable for fishing purposes and for preservation by the present invention.

In setting forth the invention the several steps will specify stated quantities of ingredients but is to be understood that the invention is not limited to the specific quantities set forth as slight variations may be permissible without departing from the spirit of the invention.

The process of the present invention is as follows:

*Step 1.*—A round butter tub of approximately 24 quart capacity is lined over the bottom and sides with pure white double waxed freezer paper. This is necessary so that the shiner minnows will retain their original silvery luster.

*Step 2.*—Pack 3 inches of fine, white sawdust from kiln-dried soft wood lumber in the bottom of the tub.

*Step 3.*—In a separate container of suitable size to allow for the necessary mixing operation, place 2 quarts of live or fresh dead minnows, shiners preferred.

*Step 4.*—To the 2 quarts of minnows is added 24 ounces of fine table salt.

*Step 5.*—Add 4 ounces of sugar curing salt.

*Step 6.*—Add ½ tablespoon of liquid smoke.

*Step 7.*—Mix the minnows, salt, and liquid smoke thoroughly.

*Step 8.*—Empty the above stated mixture into the butter tub on top of the sawdust layer.

*Step 9.*—Level off the layer of minnows and add a layer 3 inches deep, of the same type of sawdust used in step 2.

*Step 10.*—Repeat the process outlined in steps 3 to 9 inclusive until the tub is full, allowing room for a 2 inch layer of sawdust on top of the last layer of minnows.

*Step 11.*—Cover the tub with a water tight lid and place in cold storage for a period of 21 days. The temperature in the cold storage must be maintained at between 36° and 30° above zero Fahrenheit.

*Step 12.*—After the 21 days of curing under the above stated conditions, the minnows will be ready for use as bait. It will be found that their color, shape, and shine will be retained and that they will have the extremely desirable feature of being tougher in texture than live minnows. It will further be found that the minnows will have shrunk somewhat in size due to the loss of moisture content through the curing process. They will, however, regain almost their original size after being submerged in water for a short period of time.

A very important advantage of the present invention is in overcoming objections raised in many areas of transporting live bait from one lake or stream to another. It is argued by many conservation officials that there is the ever present danger of contaminating lakes with undesirable species of fish such as carp, red horse and buffalo fish. With the use of sugar cured minnows, according to the present invention, this objection is entirely eliminated because in the finished product the minnows or fish are always dead. Several of the States and Provinces of Canada have it written into their statutes that it is illegal to use live bait from any lake or stream other than the one in which the fishing is done.

By using minnows cured according to the present process the elimination of waste in handling and selling live bait is obtained for the reason that weak minnows or fresh dead minnows may be preserved and used by the present sugar curing method. This is definitely sound conservation because in many sections of the United States the supply of suitable bait is at a dangerously low ebb.

From the foregoing it will be seen that there is provided by the present invention a novel process of preserving minnows for fishing purposes, which has many advantages over the use of live bait.

The material "sugar curing salt" hereinbefore referred to is a well known commercial product obtainable in the market for use in connection with the treatment of hams and bacon and consists of salt, sugar, refined condensed smoke, sodium nitrate, propylene glycol, and spices.

Liquid smoke is also a well known preparation used in connection with the treatment of meats and comprises a liquid obtained by the distillation of wood.

I claim:

1. The process of preserving minnows for fishing bait which comprises placing in a suitable receptacle alternate layers of minnows and sawdust after mixing the minnows with table salt, sugar-curing salt and liquid smoke, then closing the receptacle with a water tight cover; and subjecting the minnows in the covered receptacles to a temperature of between 36° and 30° F. for at least twenty-one days.

2. The hereindescribed process of curing and preserving minnows which comprises lining a suitable receptacle with waxed freezer paper, then filling the receptacle with alternate layers of fine, white soft wood sawdust and minnows, after treating the minnows by mixing with each two quarts thereof twenty-four ounces of fine table salt, four ounces of sugar-curing salt and one-half tablespoonful of liquid smoke, covering the top layer of minnows with a layer of the saw dust, then applying a water tight lid to the receptacle and then subjecting the filled receptacle to a curing period of at least twenty-one days at a temperature of between 36° and 30° F.

References Cited in the file of this patent

UNITED STATES PATENTS

| | | |
|---|---|---|
| 352,666 | Syllwasschy | Nov. 16, 1886 |
| 1,223,790 | Holzapfel | Apr. 24, 1917 |

FOREIGN PATENTS

| | | |
|---|---|---|
| 18,345 | Great Britain | 1911 |